(12) United States Patent
Swanson et al.

(10) Patent No.: US 8,688,812 B2
(45) Date of Patent: Apr. 1, 2014

(54) CLUSTER COMPUTING—NIC BASED OS PROVISION

(75) Inventors: Robert C. Swanson, Olympia, WA (US); Mallik Bulusu, Olympia, WA (US); Vincent J. Zimmer, Federal Way, WA (US); Palsamy Sakthikumar, Puyallup, WA (US); Michael A. Rothman, Puyallup, WA (US)

(73) Assignee: Intel Corporation, Sant Clara, CA (US)

( * ) Notice: Subject to any disclaimer, the term of this patent is extended or adjusted under 35 U.S.C. 154(b) by 129 days.

(21) Appl. No.: 12/888,666

(22) Filed: Sep. 23, 2010

(65) Prior Publication Data

US 2012/0079085 A1 Mar. 29, 2012

(51) Int. Cl.
*G06F 15/16* (2006.01)

(52) U.S. Cl.
USPC .......................................... 709/222; 709/219

(58) Field of Classification Search
USPC ......... 709/222, 217, 219, 220, 223–224, 226, 709/201–202; 713/1, 2
See application file for complete search history.

(56) References Cited

U.S. PATENT DOCUMENTS

| | | | | |
|---|---|---|---|---|
| 6,609,151 | B1 * | 8/2003 | Khanna et al. | 709/222 |
| 6,928,541 | B2 * | 8/2005 | Sekiguchi | 713/2 |
| 7,395,324 | B1 * | 7/2008 | Murphy et al. | 709/223 |
| 7,418,588 | B2 * | 8/2008 | Lin et al. | 713/2 |
| 7,747,847 | B2 * | 6/2010 | El Zur et al. | 713/2 |
| 2003/0126426 | A1 * | 7/2003 | Frye, Jr. | 713/2 |
| 2003/0221094 | A1 | 11/2003 | Pennarun | |
| 2004/0267913 | A1 | 12/2004 | Koneru | |
| 2008/0046708 | A1 | 2/2008 | Fitzgerald et al. | |
| 2008/0109536 | A1 | 5/2008 | Hong et al. | |
| 2009/0254641 | A1 * | 10/2009 | Liu et al. | 709/222 |
| 2010/0077066 | A1 * | 3/2010 | Chawla et al. | 709/222 |
| 2010/0161843 | A1 * | 6/2010 | Spry | 710/22 |
| 2010/0235615 | A1 * | 9/2010 | Manczak et al. | 713/2 |

FOREIGN PATENT DOCUMENTS

| | | |
|---|---|---|
| JP | 10-307714 | 11/1998 |
| JP | 2003-044288 | 2/2003 |
| KR | 10-2002-0022263 A | 3/2002 |
| WO | 2004-074959 A2 | 9/2004 |

OTHER PUBLICATIONS

Patrick Schmid, "Chipset Basics: Meaning and Functions," Jul. 16, 2002, Tom's Hardware, www.tomshardware.com/reviews/full-power,490-2.html.*

International Search Report mailed Mar. 20, 2012 for PCT/US2011/053045, 3 pages.

Written Opinion mailed Mar. 20, 2012 for PCT/US/2011/053045, 5 pages.

(Continued)

*Primary Examiner* — Ruolei Zong
(74) *Attorney, Agent, or Firm* — Schwabe, Williamson & Wyatt, P.C.

(57) ABSTRACT

A network interface card with read-only memory having at least a micro-kernel of a cluster computing operation system, a server formed with such network interface card, and a computing cluster formed with such servers are disclosed herein. In various embodiments, on transfer, after an initial initialization phase during an initialization of a server, the network interface card loads the cluster computing operation system into system memory of the server, to enable the server, in conjunction with other similarly provisioned servers to form a computing cluster. Other embodiments are also disclosed and claimed.

18 Claims, 3 Drawing Sheets

(56) References Cited

OTHER PUBLICATIONS

Notification Concerning Transmittal of International Preliminary Report on Patentability mailed Apr. 4, 2013 for International Application No. PCT/US2011/053045, 7 pages.
Office Action mailed Jun. 19, 2013 for Korean Patent Application No. 2011-7031600, 1 page.
Office Action mailed May 28, 2013 for Japanese Patent Application No. 2012-535466, 7 pages.
Extended European Search Report mailed Jul. 4, 2013 for European Application No. 11799144.8, 6 pages.
Final Office Action mailed Oct. 1, 2013 for Japanese Application No. 2012-535466, 2 pages.
Office Action mailed Dec. 4, 2013 for Taiwan Application No. 100133477, 9 pages.

* cited by examiner

CLUSTER COMPUTING—NIC BASED OS PROVISION

TECHNICAL FIELD

Embodiments of the present disclosure relate to the field of data processing, in particular, to methods, apparatuses, and articles associated with provisioning cluster computing operating systems for heterogeneous servers of a computing cluster.

BACKGROUND

Unless otherwise indicated herein, the materials described in this section are not prior art to the claims in this application and are not admitted to be prior art by inclusion in this section.

With continuing advances in integrated circuit and computing technology, today scale out server clustering is becoming increasingly larger. Thus, to be able to scale out efficiently is of increasing importance. Equally important is the enabling of each basic input/output service (BIOS) vendor to support the various application programming interfaces (APIs), Unified Extensible Firmware Interface, Rapid Boot and so forth. Unfortunately, most computing platforms include mixtures of ingredients from different vendors that generally do not work well with each other. As a result, under today's technology, it is increasingly difficult to get servers of different vendors to work consistently or cohesively to form a computing cluster.

BRIEF DESCRIPTION OF THE DRAWING

Embodiments of the present disclosure will be presented by way of exemplary embodiments, but not limitations, illustrated in the accompanying drawings in which like references denote similar elements, and in which.

DETAILED DESCRIPTION

Methods, components, and systems associated with cluster computing are disclosed herewith. In embodiments, a network interface card may be provided with a read-only memory having stored therein a number of programming instructions configured to program the network interface card to provision a cluster computing operating system for a server hosting the network interface card. The programming instructions may be configured to implement at least a micro kernel of the cluster computing operating system.

In embodiments, a method may include transferring control to a network interface card after an initial initialization period, during an initialization of a server hosting the network interface card. In response, the network interface card may load a copy of a cluster computing operating system into system memory of the host server. Thereafter, execution control may be transferred to the cluster computing operating system to complete initialization. On completion of initialization, cluster computing may ensue.

In embodiments, the server and at least one other server have respective copies of the same or similar cluster computing operating systems, and form a computing cluster. The server and the at least one other server may be heterogeneous, provided by different vendors.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

Figure 1:
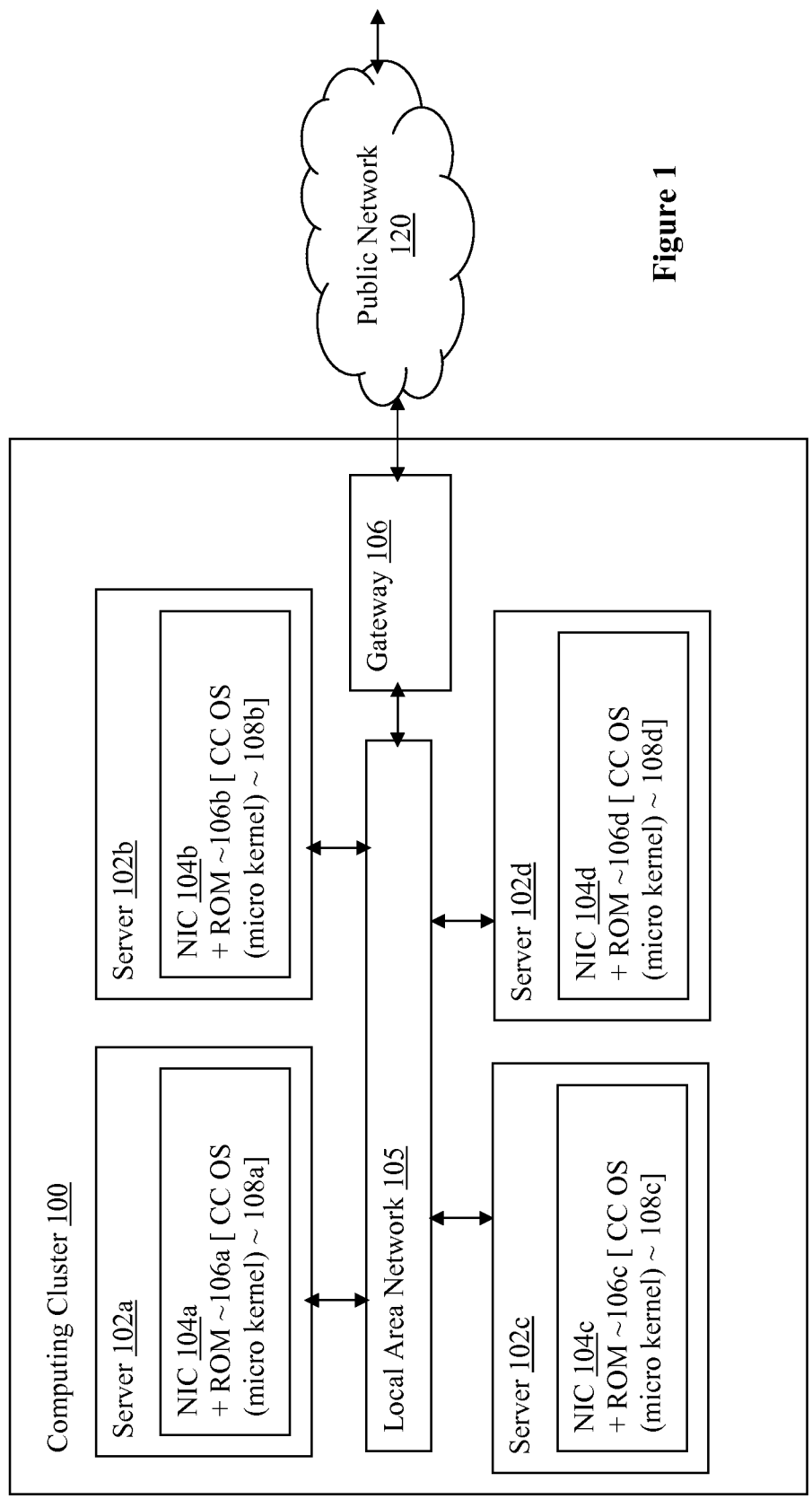
FIG. 1 illustrates an overview of a computing cluster of servers with network interface cards configured to respectively provision the servers with cluster computing operating systems.

FIG. 1 illustrates an overview of a computing cluster of servers with respective network interface cards configured to provision the servers with respective cluster computing operating systems, in accordance with embodiments of the present disclosure. As illustrated, computing cluster 100 may include a number of servers 102*a*-102*d*. Each of servers 102*a*-102*d* may include a network interface card 104*a*-104*d* having expansion read-only memory (ROM) 106*a*-106*d* (that is a non-transitory computer-readable storage medium) with respective copies of at least a micro kernel of a cluster computing operating system 108*a*-108*d* stored therein. Expansion ROM may also be referred to as option ROM. As will be described in more detail below, network interface cards 104*a*-104*d* are configured to provision their respective host servers with their respective cluster computing operating systems, which may be the same or similar. For the purpose of this application, including the claims, two cluster computing operating systems are similar, when the two operating systems can work together seamlessly to enable the two servers to form a computer cluster to offer cluster computing. The two servers may be homogenous, provided by the same vendors, or heterogeneous, provided by different vendors.

Still referring to FIG. 1, servers 102*a*-102*d* may be coupled to one another and a gateway 106 via a local area network 105. Gateway 106 may in turn be coupled with public network 120. Local area network 105, gateway 106 and public network 120 are intended to represent a broad range of these elements/devices known in the art. In particular, public network 120 may include the Internet.

Similarly, except for the teachings of the present disclosure, servers 102*a*-102*d* are intended to represent a broad range of computer servers known in the art. While for ease of understanding, four servers are illustrated in FIG. 1, the present disclosure is not so limited. The present disclosure may be practiced with more or less servers in a computing cluster.

Figure 2:
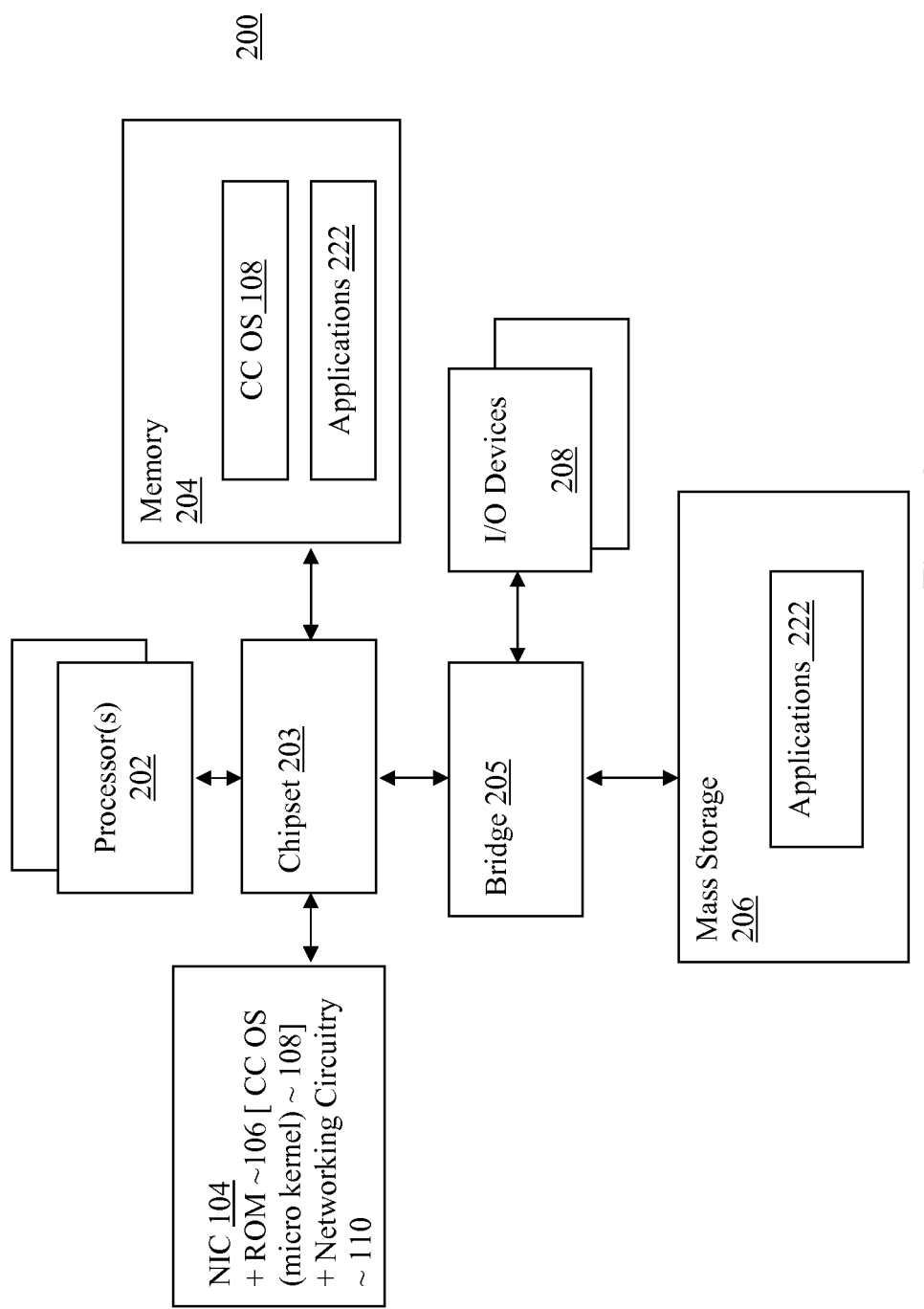
FIG. 2 illustrates an example computer system suitable for use to practice the server aspects of the computing cluster of FIG. 1.

FIG. 2 illustrates an example computer system suitable for use to practice the server aspects of various embodiments of the present disclosure. As shown, computing system 200 may include a number of processors or processor cores 202, system memory 204 (that is a non-transitory computer-readable storage medium), chipset 203 and network interface card 104, coupled to each other. For the purpose of this application, including the claims, the terms "processor" and "processor cores" may be considered synonymous, unless the context clearly requires otherwise. As described earlier, network interface card 104 may include networking circuitry 110, and read-only memory 106 having a copy of at least a micro kernel of a cluster computing operating system 108. In various embodiments, network interface card 104 may be coupled with chipset 203 via a peripheral component interconnect express (PCIe) bus (not shown). Network interface card 104 may be configured with an appropriate PCIe connector for coupling with the PCIe bus.

Additionally, computing system 200 may include bridge 205, mass storage devices 206 (such as diskette, hard drive, compact disc read only memory (CDROM) or other non-transitory computer-readable storage medium), and input/output devices 208 (such as display, keyboard, cursor control and so forth), coupled with each other and the earlier enumerated elements.

Each of these elements may perform its conventional functions known in the art. In particular, system memory 204 and mass storage 206 may be employed to store a working copy and a permanent copy of the programming instructions implementing various applications 222. The cluster computing operating system 108 and the various applications may be selectively implemented by assembler instructions supported by processor(s) 202 or high-level languages, such as, for example, C, that can be compiled into such instructions.

The permanent copy of the programming instructions of applications 222 may be placed into permanent storage 206 in the factory, or in the field, through, for example, a distribution medium (not shown), such as a compact disc (CD) or other non-transitory computer-readable storage medium, or through NIC 104 (from a distribution server (not shown)). That is, one or more distribution media having implementations of applications 222 may be employed to distribute the applications 222 and program various servers 200.

Except for the circuitry and/or logic provided to support and/or implement the initialization process of computer system server 200, to be described more fully below, the constitution of these elements 202-216 and 208 are known, and accordingly will not be further described.

Figure 3:
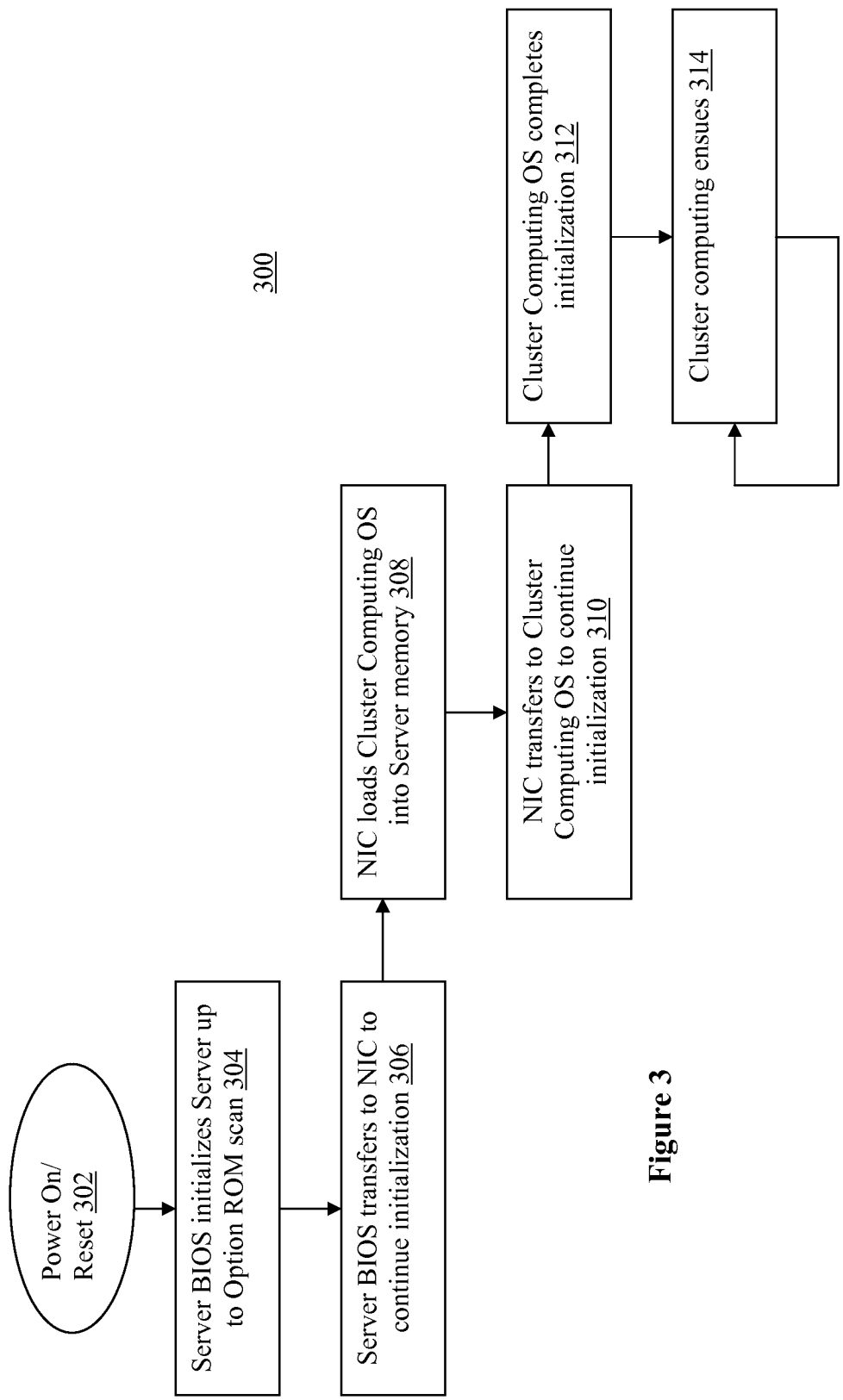
FIG. 3 illustrates an initialization process suitable for the servers of FIG. 1, all arranged in accordance with embodiments of the present disclosure.

Referring now to FIG. 3, wherein an initialization process suitable for the servers of FIG. 1, according to various embodiments of the present disclosure, is shown. As illustrated, in the event of power on or reset, 302, the BIOS of a server may proceed to initialize the server, i.e., initializing the various components of the server up to an option ROM scan stage, 304. For ease of understanding, this period may be referred to as the initial initialization phase during an initialization of the server. When the option ROM scan stage is reached, the BIOS may proceed to transfer to the network interface card to continue initialization, 306.

Upon transferring, the network interface card may proceed to load a copy of the cluster computing operating system into the system memory of the server, 308. In various embodiments, where an entire copy of the cluster computing operating system is stored in the ROM of the network interface card, the cluster computing operating system is copied into the system memory from the ROM of the network interface card. In other embodiments, where only a micro kernel of the cluster computing operating system is stored in the ROM of the network interface card, the rest of the cluster computing operating system may be copied into the system memory, by the micro kernel, from a remote server.

Upon copying the cluster computing operating system into the system memory, the network interface card may transfer to the cluster computing operating system in system memory, to continue initialization, 310. On transfer, the cluster computing operating system in system memory may complete initialization, 312. Thereafter, cluster computing may ensue, 314, with the server and at least one other server, similarly provisioned, forming a computing cluster.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present invention. This application is intended to cover any adaptations or variations of the embodiments discussed herein. Therefore, it is manifestly intended that the embodiments of the present invention be limited only by the claims and the equivalents thereof.

What is claimed is:

1. A method for cluster computing, comprising:
    initializing, by a basic input/output service (BIOS), in response to power on or reset of a server, a plurality of components of the server up to an option read-only memory (ROM) scan stage;
    transferring control by the BIOS of the server to a network interface card (NIC) of the server, after the initialization of the server up to the option ROM scan stage;
    loading into system memory of the server, by the NIC, a cluster computing operating system, wherein at least a micro-kernel of the cluster computing operating system is stored in an option ROM of the NIC;
    transferring, by the NIC, control of the server to the cluster computing operating system, and
    completing initialization of the server, by the cluster computing operating system;
    wherein the server and at least one other server, having a NIC with a similarly provisioned option ROM, form a computing cluster via the cluster computing operating system.

2. The method of claim 1, wherein loading comprises loading into the system memory of the server, by the NIC, a portion of the cluster computing operating system, from another remote server.

3. The method of claim 1, wherein the micro-kernel of the cluster computing operating system is configured to retrieve the rest of the cluster computing operating system from a remote server.

4. The method of claim 1 further comprising:
    transferring control by basic input/output service of the at least one other server to a NIC of the at least one other server during an initialization of at least one other server, after initialization of the other server up to an option ROM scan stage; and
    loading into system memory of the at least one other server, by the NIC of the at least one other server, the cluster computing operating system; and
    completing initialization of the at least one other server, by the cluster computing operating system loaded into system memory of the at least one other server.

5. The method of claim 1, wherein the server and the at least one other server having a NIC with a similarly provisioned option ROM, are heterogeneous.

6. A network interface card (NIC) comprising:
networking circuitry; and
read-only memory (ROM) coupled to the networking circuitry, and having stored therein at least a micro-kernel of a cluster computing operating system configured to load the cluster computing operating system into system memory of a server hosting the NIC, after the NIC is given control by basic input/output service (BIOS) of the server, after initialization of the server up to an option ROM scan stage by the BIOS;
wherein the server and at least one other server, having a NIC with a similarly provisioned option ROM, form a computing cluster.

7. The network interface card of claim 6, wherein the micro-kernel is further configured to retrieve the rest of the cluster computing operating system from another remote server.

8. The network interface card of claim 6, further comprising a PCIe connector configured to couple the NIC to a PCIe bus of the server.

9. The network interface card of claim 6, wherein the server and the at least one other server having a NIC with a similarly provisioned option ROM are heterogeneous.

10. A server comprising:
a processor;
system memory;
a basic input/output service (BIOS) configured to initialize a plurality of components of the server up to an option read-only memory (ROM) scan stage in response to power on or reset of the server; and
a network interface card (NIC) coupled with the processor and the system memory, wherein the NIC includes read-only memory (ROM) having stored therein at least a micro-kernel of a cluster computing operating system and the NIC is configured to load at least the micro-kernel of the cluster computing operating system into the system memory, after the NIC is given control by the BIOS, after initialization of the server up to the option ROM scan stage;
wherein the server and at least one other server, having a NIC with a similarly provisioned option ROM, form a computing cluster via the cluster computing operating system.

11. The server of claim 10, wherein the the micro-kernel is configured to retrieve the rest of the cluster computing operating system from another remote server.

12. The server of claim 10, wherein the read-only memory comprises the entire cluster computing operating system.

13. The server of claim 10, further comprising a PCIe bus, wherein the NIC further includes a PCIe connector configured to couple the NIC to the PCIe bus.

14. The server of claim 13, further comprising a bridge coupled to a chipset, and a plurality of input/output devices coupled to the bridge.

15. The server of claim 10, wherein the server and the at least one other server having a NIC with a similarly provisioned option ROM are heterogeneous.

16. An article of manufacture, comprising:
a non-transitory computer readable storage medium having a plurality of programming instructions stored thereon, wherein the instructions, when executed by a network interface card (NIC) of a server, configure the NIC, in response to being given control after an initialization of the server up to an option ROM scan stage, to load at least a portion of a cluster computing operating system into system memory of the server hosting the NIC;
wherein the server and at least one other server, having a NIC with a similarly provisioned computer readable storage medium, form a computing cluster via the cluster computing operating system.

17. The article of claim 16, wherein the portion of the cluster computing operating system is a micro-kernel of the cluster computing operating system and the micro-kernel is configured to retrieve the rest of the cluster computing operating system, from another remote server.

18. The article of claim 16, wherein the server and the at least one other server having a NIC with a similarly provisioned computer readable storage medium are heterogeneous.

\* \* \* \* \*